United States Patent
Hockaday

(10) Patent No.: US 10,365,167 B2
(45) Date of Patent: Jul. 30, 2019

(54) FIBER GRATING TEMPERATURE SENSOR

(71) Applicant: United Technologies Corporation, Farmington, CT (US)

(72) Inventor: Bruce Hockaday, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 266 days.

(21) Appl. No.: 15/034,221

(22) PCT Filed: Nov. 4, 2014

(86) PCT No.: PCT/US2014/063820
§ 371 (c)(1),
(2) Date: May 4, 2016

(87) PCT Pub. No.: WO2015/069623
PCT Pub. Date: May 14, 2015

(65) Prior Publication Data
US 2016/0273974 A1  Sep. 22, 2016

Related U.S. Application Data

(60) Provisional application No. 61/901,548, filed on Nov. 8, 2013.

(51) Int. Cl.
*G01K 11/32* (2006.01)
*G01K 1/14* (2006.01)

(52) U.S. Cl.
CPC ............. *G01K 11/3206* (2013.01); *G01K 1/14* (2013.01)

(58) Field of Classification Search
CPC ...... G01K 11/3206; G01K 11/32; G01K 1/14; G01K 2011/322; G01K 2011/324; G01D 5/268
See application file for complete search history.

(56) References Cited

U.S. PATENT DOCUMENTS 2,686,156 A * 8/1954 Dupler .................. C10M 7/00
423/268
3,015,623 A * 1/1962 Loring .................. C10M 5/00
508/169

(Continued)

FOREIGN PATENT DOCUMENTS

| CN | 2627479 | 7/2004 |
|----|---------|--------|
| CN | 101413831 | 4/2009 |

(Continued)

OTHER PUBLICATIONS

The International Preliminary Report on Patentability for PCT Application No. PCT/US2014/063820, dated May 19, 2016.

(Continued)

*Primary Examiner* — Lisa M Caputo
*Assistant Examiner* — Philip L Cotey
(74) *Attorney, Agent, or Firm* — Carlson, Gaskey & Olds, P.C.

(57) ABSTRACT

A fiber grating temperature sensor includes a hollow tube, an optical fiber disposed in the hollow tube such that a gap exists between at least a portion of an internal surface of the hollow tube and an exterior surface of the optical fiber. The optical fiber includes at least one Bragg grating. A lubricant is disposed within the hollow tube, between the exterior surface of the fiber and the interior surface of the hollow tube.

20 Claims, 1 Drawing Sheet

(56) References Cited

U.S. PATENT DOCUMENTS

| | | | | |
|---|---|---|---|---|
| 4,640,576 | A * | 2/1987 | Eastwood | G02B 6/4485 226/7 |
| 4,828,729 | A * | 5/1989 | Centers | C10M 103/06 508/169 |
| 5,721,615 | A | 2/1998 | McBride et al. | |
| 5,892,582 | A * | 4/1999 | Bao | G01D 5/35383 250/227.27 |
| 6,118,914 | A * | 9/2000 | Davis | G02B 6/0218 385/12 |
| 6,442,304 | B1 * | 8/2002 | Crawley | E21B 47/011 374/E11.016 |
| 6,462,329 | B1 * | 10/2002 | Davis | G01K 11/32 250/227.14 |
| 6,527,441 | B1 * | 3/2003 | Cranch | G01K 11/3206 250/227.18 |
| 6,567,173 | B1 * | 5/2003 | Johannesen | A61B 5/02154 356/480 |
| 6,813,013 | B2 * | 11/2004 | Fernald | G01K 5/52 356/73.1 |
| 6,923,048 | B2 | 8/2005 | Willsch et al. | |
| 7,142,752 | B2 * | 11/2006 | Chiasson | G02B 6/4402 385/100 |
| 7,406,877 | B2 | 12/2008 | Tian | |
| 7,881,567 | B2 | 2/2011 | Bosselmann et al. | |
| 8,515,215 | B2 | 8/2013 | Younge et al. | |
| 2002/0154860 | A1 * | 10/2002 | Fernald | G01L 11/025 385/37 |
| 2002/0172446 | A1 * | 11/2002 | Fernald | G01K 5/52 385/12 |
| 2003/0127587 | A1 * | 7/2003 | Udd | G01D 5/35383 250/227.14 |
| 2004/0061628 | A1 * | 4/2004 | Hill | E01F 11/00 340/942 |
| 2004/0067004 | A1 * | 4/2004 | Hill | G08G 1/02 385/13 |
| 2004/0218863 | A1 | 11/2004 | Skull et al. | |
| 2005/0061058 | A1 * | 3/2005 | Willsch | G01K 11/32 73/23.32 |
| 2005/0088662 | A1 * | 4/2005 | Bohnert | G01R 15/246 356/483 |
| 2009/0101823 | A1 * | 4/2009 | Jez | G01S 7/4818 250/341.1 |
| 2009/0123109 | A1 * | 5/2009 | Zhou | G01K 11/3206 385/12 |
| 2010/0119202 | A1 * | 5/2010 | Overton | C03C 25/106 385/141 |
| 2010/0232963 | A1 | 9/2010 | Volanthen et al. | |
| 2010/0242619 | A1 | 9/2010 | Le Blanc et al. | |
| 2013/0004135 | A1 * | 1/2013 | Bigot-Astruc | G02B 6/0288 385/126 |
| 2013/0022308 | A1 * | 1/2013 | Wild | G01B 11/18 385/12 |

FOREIGN PATENT DOCUMENTS

| | | |
|---|---|---|
| CN | 102169027 | 8/2011 |
| WO | 2008028813 | 3/2008 |

OTHER PUBLICATIONS

International Search Report and Written Opinion for PCT Application No. PCT/US2014/063820, dated Feb. 11, 2015.

* cited by examiner

FIBER GRATING TEMPERATURE SENSOR

CROSS-REFERENCE TO RELATED APPLICATION

This application claims priority to U.S. Provisional Application No. 61/901,548 filed on Nov. 8, 2013.

TECHNICAL FIELD

The present disclosure relates generally to temperature sensors, and more specifically to fiber grating sensor packages.

BACKGROUND

Fiber grating sensors, such as Bragg sensors, utilize an optical fiber that transmits light down the length of the fiber. A grating is inscribed in the fiber at periodic locations along the length of the fiber. The grating reflects light of a singular wavelength band and allows all other wavelengths to pass. Thus, the light reflected back to the source is reflected on a narrow optical wavelength band (about 25 nm) when illuminated within a broadband source, such as a super luminescent diode. Alternatively, the light transmitted can be analyzed to observe the narrow optical wavelength bands removed by the grating.

Thermal expansion or contraction of the fiber affects the gratings, which in turn alters the wavelength of the light reflected by the grating. Thus, by sensing the wavelength of the reflected light, a properly configured controller can determine the magnitude of thermal expansion or contraction of the fiber. This magnitude is then used by the controller to extrapolate the temperature of the fiber, as the thermal expansion and contraction rates of the fiber are known.

In this way, a fiber grating sensor can determine the temperature of a component.

SUMMARY OF THE INVENTION

A fiber grating temperature sensor according to an exemplary embodiment of this disclosure, among other possible things includes a hollow tube, an optical fiber disposed in the hollow tube such that a gap exists between at least a portion of an internal surface of the hollow tube and an exterior surface of the optical fiber, the optical fiber includes at least one Bragg grating, a lubricant disposed within the hollow tube, between the exterior surface of the fiber and the interior surface of the hollow tube.

In a further embodiment of the foregoing fiber granting temperature sensor, the lubricant is a dry lubricant.

In a further embodiment of the foregoing gas turbine engine, the dry lubricant includes molybdenum disulfide.

In a further embodiment of the foregoing fiber granting temperature sensor, the lubricant is a liquid lubricant.

In a further embodiment of the foregoing fiber granting temperature sensor, the lubricant is an oil based lubricant.

In a further embodiment of the foregoing fiber granting temperature sensor, the lubricant is a gel lubricant.

In a further embodiment of the foregoing fiber granting temperature sensor, the gel lubricant is a silicon based lubricant.

In a further embodiment of the foregoing fiber granting temperature sensor, the optical fiber is defined by a lack of a fabric sheath.

In a further embodiment of the foregoing fiber granting temperature sensor, the optical fiber includes a metal coating on an exterior surface of the optical fiber.

In a further embodiment of the foregoing fiber granting temperature sensor, the metal coating includes a gold coating.

In a further embodiment of the foregoing fiber granting temperature sensor, the lubricant increases a rate of heat transfer between the hollow tube and the optical fiber.

A gas turbine engine according to an exemplary embodiment of this disclosure, among other possible things includes a hollow tube mounted to an exterior of the gas turbine engine component, an optical fiber disposed in the hollow tube such that a gap exists between at least a portion of an internal surface of the hollow tube and an exterior surface of the optical fiber, the optical fiber includes at least one Bragg grating, a lubricant disposed within the hollow tube, between the exterior surface of the fiber and the interior surface of the hollow tube a light source disposed on a first end of the optical fiber, a light sensor operable to detect wavelengths of light transmitted in the optical fiber, the light sensor is disposed at one of the first end of the optical fiber and a second end of the optical fiber opposite the first end, a controller connected to the light sensor, the controller being operable to convert received wavelengths into a corresponding temperature reading.

In a further embodiment of the foregoing gas turbine engine, the lubricant is one of a dry lubricant, a wet lubricant and a gel lubricant.

In a further embodiment of the foregoing gas turbine engine, the dry lubricant includes molybdenum disulfide.

In a further embodiment of the foregoing gas turbine engine, the hollow tube is maintained in direct contact with a housing of the gas turbine engine component.

In a further embodiment of the foregoing gas turbine engine, the hollow tube is constructed of a first material, and the housing of the gas turbine engine component is constructed of a second material, and the first material and the second material have matching coefficients of thermal expansion.

In a further embodiment of the foregoing gas turbine engine, the hollow tube is maintained adjacent the gas turbine engine component via at least one bracket.

In a further embodiment of the foregoing gas turbine engine, the bracket is thermally conductive.

In a further embodiment of the foregoing gas turbine engine, the bracket is thermally non-conductive.

A method for protecting a fiber grating temperature sensor according to an exemplary embodiment of this disclosure, among other possible things includes disposing a lubricant in a fiber grating temperature sensor such that the lubricant is positioned between an exterior surface of an optical fiber and an interior surface of a hollow tube.

The foregoing features and elements may be combined in any combination without exclusivity, unless expressly indicated otherwise.

These and other features of the present invention can be best understood from the following specification and drawings, the following of which is a brief description.

DETAILED DESCRIPTION OF AN EMBODIMENT

Figure 1:
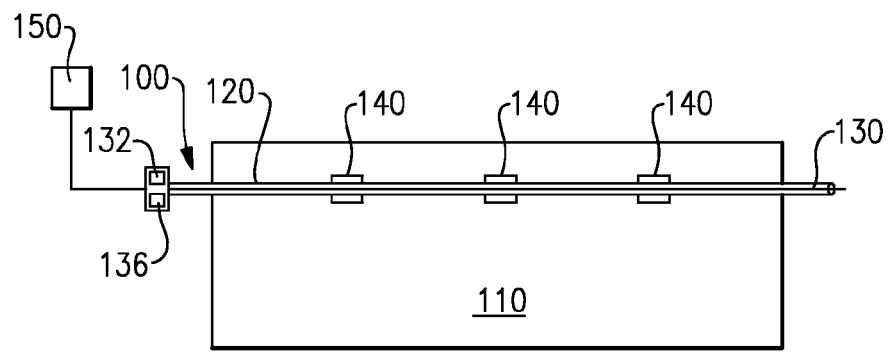
FIG. 1 schematically illustrates a fiber grating sensor on a component.

FIG. 1 schematically illustrates a fiber grating sensor 100 mounted to a component 110. The sensor 100 includes is a hollow metal tube 120, such as a hypotube, with an optical fiber 130 disposed within the metal tube 120. A light source 132, such as a super luminescent diode, is positioned on one end of the optical fiber 130. Light emitted from the light source 132 is transmitted along the optical fiber 130 and exits the optical fiber 130 at an opposite end. A light sensor 136 is positioned adjacent the light source 132, such that the wavelength of light reflected within the optical fiber 130 can be determined by the light sensor 136. The light sensor 136 communicates the detected wavelength to an external controller 150. In alternate examples, the light sensor 136 can include an internal controller instead of reporting the detected wavelength to the external controller 150.

Disposed periodically across the optical fiber 130 are inscribed gratings (referred to alternately as Bragg gratings) that remove by reflection a specific wavelength, or band of wavelengths, from the light passing through the optical fiber 130. The light sensor 136 detects the reflected wavelengths of the reflected light. In one example, the inscribed gratings are equidistantly spaced along the optical fiber 130. As the optical fiber 130 heats up or cools down, the optical fiber 130 expands or contracts according to known thermal expansion coefficients. The expansion and contraction of the optical fiber 130 causes a corresponding alteration to the wavelength of the light reflected by the gratings. Thus, the controller 150 can determine how much shift has occurred in the reflected wavelength based on a comparison between the wavelengths of light being detected by the sensor 136 and the expected wavelengths of the reflected light with no thermal expansion or contraction.

The shift in the reflected wavelength is then converted according to known Bragg grating principles into a temperature reading that provides the temperature along the optical fiber 130. The Bragg grating temperature conversion utilizes the known thermal expansion traits of the optical fiber 130 and the known effect of the thermal expansion on the wavelength of the reflected light to generate the temperature reading based on the detected wavelength.

In some existing fiber grating temperature sensors, the optical fiber 130 is packaged tightly within a metal tube, or contained within a fabric coating that is then tightly placed within the tube. In these examples, thermal expansion and contraction of the metal tube or the fabric layer can affect or impede the expansion and contraction of the optical fiber 130 itself. A controller cannot account for the additional stresses on the optical fiber resulting from mismatch between the thermal expansion of the fabric layer or the metal tube and the thermal expansion of the optical fiber. Thus, the output temperature determined by the controller can be affected or contaminated by the thermal expansion of the metal tube or the fabric layer.

In the example sensor 100 illustrated in FIG. 1, the optical fiber 130 is contained loosely within a metal tube 120. By containing the optical fiber 130 loosely within the metal tube 120, the metal tube 120 is allowed to expand or contract without a mismatch between the metal tube 120 and the optical fiber 130 straining the optical fiber 130. In some examples, the optical fiber 130 is attached to the housing of the component 110 at a point where no grating is located in order to maintain the optical fiber 130 within the metal tube 120 and prevent the fiber from being pulled out of the metal tube 120 during operation. The metal tube 120 is connected to the component 110 via a plurality of brackets 140. The brackets 140 can be any bracket type.

As a further benefit of removing the strain due to thermal expansion mismatch between the optical fiber 130 and the metal tube 120, the metal tube 120 can be constructed of a material designed to thermally match the component 110 to which the sensor 100 is being attached. The thermal matching, in turn, allows the metal tube 120 to be directly connected to the component 110 via welding, brazing, tack strapping, or any similar connection in place of the above described brackets 140.

The fiber grating temperature sensing system 100 is typically utilized for one of two purposes. The first purpose is to measure the temperature of a component 110 along, or through, the component 110. The second purpose is to measure the temperature of ambient air surrounding, or adjacent to, the component 110.

When the temperature sensor 100 is designed to measure the temperature of the component itself, the brackets 140 are selected of a bracket type and material that is a good conductor of heat, or the metal tube 120 is connected directly to the component 110 as described above. This style bracket, in turn, conducts the heat directly from the component 110 into the hollow metal tube 120, which translates the heat to the optical fiber 130 causing thermal expansion of the optical fiber 130. This arrangement provides a temperature reading of the component 110.

In contrast, when the temperature sensor 100 is utilized to measure the temperature of the ambient air surrounding the component 110, the brackets 140 are resistive to heat transfer (insulative), thereby preventing heat from the component 110 from being transferred into the optical fiber 130. The metal tube 120 is thermally conductive and allows ambient heat from the atmosphere around the component 110 to permeate into the metal tube 120 and heat the optical fiber 130. This arrangement provides a temperature reading of the ambient atmosphere surrounding the metal tube 120.

Figure 2A:
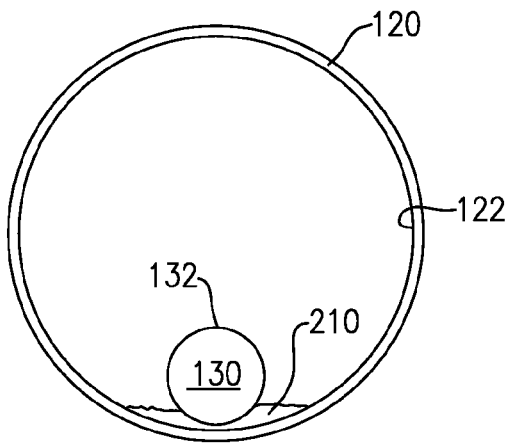
FIG. 2A illustrates a cross sectional view of an example tube and optical fiber arrangement of a fiber grating sensor.
Figure 2B:
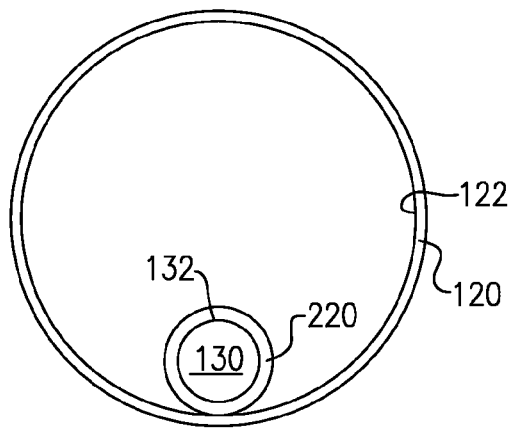
FIG. 2B illustrates a cross sectional view of another example tube and optical fiber arrangement of a fiber grating sensor.

Disposing the optical fiber 130 loosely in the metal tube 120 results in the optical fiber 130 resting against a portion of the metal tube 120 with a gap between some of the exterior surface of the optical fiber 130 and the interior surface of the tube (as is illustrated at FIGS. 2A, 2B and described below). Further, the metal tube 120 still expands and contracts according to thermal influences. The expansion and contraction of the metal tube 120 can cause rubbing between the metal tube 120 and the optical fiber 130 on the portion of the optical fiber's exterior surface that is contacting the metal tube 120.

In order to protect against this rubbing, and to prevent damage to the optical fiber 130, the fiber grating temperature sensor 100 includes a lubricant within the tube. The lubricant is disposed between the exterior surface of the optical fiber 130 and the interior surface of the metal tube 120. In some examples the lubricant is a dry lubricant, such as molybdenum disulfide. In further examples the lubricant is a wet lubricant, such as an oil based lubricant. In yet further examples, the lubricant is a gel lubricant, such as a silicon material Both the net lubricant and the gel lubricant provide the additional feature of improving the heat transfer between the tube 120 and the fiber 130.

With continued reference to FIG. 1, and with like numerals indicating like elements, FIGS. 2A and 2B illustrate cross sectional views of example metal tube 120 and optical fiber 130 arrangements of a fiber grating sensor 100, With FIG. 2A illustrating an arrangement including an optical fiber 130 having no coating and a wet or gel type lubricant 210. Due to gravity, the wet or gel type lubricant pools at the base of the metal tube 120, and is positioned between the exterior surface 132 of the optical fiber 130 and the interior surface 122 of the metal tube 120. In alternate wet or gel type lubricant 210 examples, the lubricant 210 can fill the metal tube 120, and will not pool as illustrated.

FIG. 2B illustrates an example fiber grating sensor 100 utilizing a dry lubricant 220 applied to the exterior surface 132 of the optical fiber 130. The dry lubricant applied to the optical fiber 130 contacts the interior surface of the metal tube 120, and the optical fiber 130 itself does not directly contact the metal tube 120. In some examples, the dry lubricant 220 is applied like spray paint, and covers the entire exterior surface 132 of the optical fiber 130.

Referring again to FIG. 1, some example fiber grating sensors 100 are utilized in environments, such as gas turbine engines, where the fiber grating sensor 100 is exposed to hazardous environmental conditions. In such an environment, the optical fiber 130 can be coated by a protective metal layer, such as a gold coating. The controller 150 is then calibrated to account for any existing thermal expansion mismatch between the optical fiber 130 and the coating. In such examples, the coating is applied to the optical fiber 130 and the lubricant 210, 220 is disposed between the coating and the interior surface of the metal tube 120.

Figure 3A:
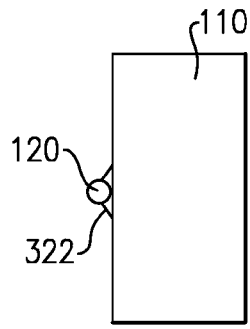
FIG. 3A illustrates a first possible connection configuration for maintaining the sensor 100 within or adjacent to a component.
Figure 3B:
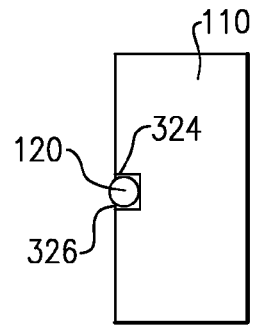
FIG. 3B illustrates a second possible connection configuration for maintaining the sensor 100 within or adjacent to a component.
Figure 3C:
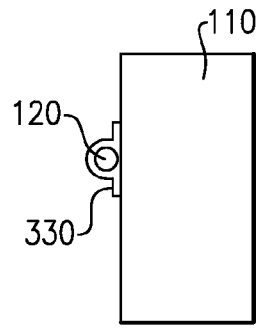
FIG. 3C illustrates a Third possible connection configuration for maintaining the sensor 100 within or adjacent to a component.

With continued reference to FIG. 1, and with like numerals indicating like elements, FIGS. 3A-C illustrate multiple possible connection configurations for maintaining the sensor 100 within or adjacent to a component 110.

In the example of FIG. 3A, the metal tube 120 is mounted to the component 110 via a weld or braze 122. Alternately, a tack strap or brazing connection can be used in place of the weld 122. The weld 122 conducts heat directly from the component 110 into the metal tube 120. In the example of FIG. 3B, however, the metal tube 120 is disposed in a channel 324 cut into, or otherwise formed in, the housing of the component 110, and is maintained in position via a braze 326. As with the example of FIG. 3A, the direct contact between the metal tube 120 and the component 110 transmits heat directly into the metal tube 120.

FIG. 3C includes multiple bracket type connectors 330. The illustrated bracket type connectors 330 maintain the metal tube 120 in direct contact with the component 110 and again are suitable for detecting the temperature of the component 110. Alternate bracket type connectors 330 maintain the metal tube 120 away from the component 110, and are thermally insulating. The alternate type connectors 330 are suitable for detecting the temperature of the ambient atmosphere surrounding the component 110.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fiber grating temperature sensor comprising:
   a hollow tube;
   an optical fiber including at least one Bragg grating, the optical fiber being disposed in said hollow tube such that a gap exists between at least a portion of an internal surface of the hollow tube and an exterior surface of the optical fiber at a position of the Bragg grating;
   a lubricant disposed within said hollow tube, between said exterior surface of the fiber and the interior surface of the hollow tube, wherein the lubricant at most partially fills the gap.

2. The fiber grating temperature sensor of claim 1, wherein the lubricant is a dry lubricant.

3. The fiber grating temperature sensor of claim 2, wherein the lubricant comprises molybdenum disulfide.

4. The fiber grating temperature sensor of claim 1, wherein the lubricant is a liquid lubricant.

5. The fiber grating temperature sensor of claim 4, wherein the lubricant is an oil based lubricant.

6. The fiber grating temperature sensor of claim 1, wherein the lubricant is a gel lubricant.

7. The fiber grating temperature sensor of claim 6, wherein the gel lubricant is a silicon based lubricant.

8. The fiber grating temperature sensor of claim 1, wherein said optical fiber is defined by a lack of a fabric sheath.

9. The fiber grating temperature sensor of claim 1, wherein said optical fiber includes a metal coating on an exterior surface of the optical fiber.

10. The fiber grating temperature sensor of claim 9, wherein said metal coating comprises a gold coating.

11. The fiber grating temperature sensor of claim 1, wherein the lubricant increases a rate of heat transfer between the hollow tube and the optical fiber.

12. A sensor system for a gas turbine engine component comprising:
    a hollow tube mounted to an exterior of a gas turbine engine component;
    an optical fiber including a Bragg grating, the optical fiber being disposed in said hollow tube such that a gap exists between at least a portion of an internal surface of the hollow tube and an exterior surface of the optical fiber at a position of the Bragg grating;
    a lubricant disposed within said hollow tube, between said exterior surface of the fiber and the interior surface of the hollow tube, wherein the lubricant at most partially fills the gap;
    a light source disposed on a first end of said optical fiber;
    a light sensor operable to detect wavelengths of light transmitted in the optical fiber, wherein the light sensor is disposed at one of said first end of the optical fiber and a second end of the optical fiber opposite said first end;
    a controller connected to said light sensor, said controller being operable to convert received wavelengths into a corresponding temperature reading.

13. The sensor system of claim 12, wherein said lubricant is one of a dry lubricant, a wet lubricant and a gel lubricant.

14. The sensor system of claim 13, wherein said dry lubricant comprises molybdenum disulfide.

15. The sensor system of claim 12, wherein said hollow tube is maintained in direct contact with a housing of the gas turbine engine component.

16. The sensor system of claim 15, wherein said hollow tube is constructed of a first material, and the housing of the gas turbine engine component is constructed of a second material, and wherein the first material and the second material have matching coefficients of thermal expansion.

17. The sensor system of claim 12, wherein said hollow tube is maintained adjacent said gas turbine engine component via at least one bracket.

18. The sensor system of claim 17, wherein said bracket is thermally conductive.

19. The sensor system of claim 17, wherein said bracket is thermally non-conductive.

20. A method for protecting a fiber grating temperature sensor comprising:

disposing a lubricant in a fiber grating temperature sensor such that said lubricant is positioned between an exterior surface of an optical fiber and an interior surface of a hollow tube, and such that the lubricant does not fill an entirety of a gap between the exterior surface of the optical fiber and the interior surface of the hollow tube such that the lubricant does not surround the optical fiber, wherein the gap is at a position of a Bragg grating portion of the optical fiber.

* * * * *